United States Patent [19]

Lajovic

[11] 4,055,142
[45] Oct. 25, 1977

[54] METHOD AND APPARATUS FOR PERFORMING A PLURALITY OF SEQUENTIAL OPERATIONS UPON EACH OF A SERIES OF ARTICLES

[76] Inventor: Dusan Sava Lajovic, 73 Victoria St., Smithfield, New South Wales, Australia, 2164

[21] Appl. No.: 613,352

[22] Filed: Sept. 15, 1975

[30] Foreign Application Priority Data

Sept. 25, 1975 Australia .............................. 9015/75

[51] Int. Cl.² .................... B05C 1/02; B05C 13/02
[52] U.S. Cl. .................................. 118/46; 101/40; 118/58; 118/223; 118/230; 198/344; 198/441; 198/450
[58] Field of Search ............... 53/131, 137; 141/1, 141/98; 198/19; 101/40; 118/46, 58, 217, 218, 223, 230

[56] References Cited

U.S. PATENT DOCUMENTS 3,765,460 10/1973 Bedin ................................. 141/98
3,835,897 9/1974 Gess .................................. 141/98

FOREIGN PATENT DOCUMENTS 1,577,849 2/1973 Germany

Primary Examiner—Richard E. Aegerter
Assistant Examiner—Frederick R. Schmidt
Attorney, Agent, or Firm—Leydig, Voit, Osann, Mayer & Holt, Ltd.

[57] ABSTRACT

Apparatus for performing a plurality of sequential operations upon each of a series of articles. In the exemplary embodiment, such apparatus is arranged to perform a two stage coating and printing operation on the outer surface of cylindrical tubes. A rotatable turret includes a first and second series of carriers angularly spaced in first and second arrays around the circumference thereof. Means are provided to index the turret to bring the tubes held in the carriers of the first array to a first operational station for coating, and the tubes held in the second array of carriers to a second operational station for printing.

5 Claims, 4 Drawing Figures

METHOD AND APPARATUS FOR PERFORMING A PLURALITY OF SEQUENTIAL OPERATIONS UPON EACH OF A SERIES OF ARTICLES

This invention relates to manufacturing processes in which it is necessary to perform a number of operations upon each of a series of articles. Although the invention is generally applicable to these processes it is well adapted for the two stage printing of articles where it is necessary to interpose a drying or curing step between successive coating applications.

It is the usual practice in such manufacturing processes to perform each of the operations by means of separate machines with the articles moving from one machine to the other in assembly line fashion. As a result of this technique, a large amount of operating staff and floor space is required and in addition, there is inevitable duplication of equipment with each machine requiring separate driving means, gearboxes and the like.

It is an object of the present invention substantially to ameliorate many of the deficiencies in prior machines by providing a processing apparatus which enables a coating and printing operation to be carried out by a single compact machine with resultant savings in space, equipment and operating staff.

According to one aspect of the invention there is provided apparatus for performing coating and printing operations on each of a series of cylindrical articles comprising:

a rotatable turret;

a plurality of first axially directed mandrels fixed to said turret and equally circumferentially pitched in an outer circular array coaxial with said turret;

A similar plurality of second axially directed mandrels fixed to said turret, said second mandrels being equally circumferentially pitched in an inner circular array concentric with said outer array and having a diameter smaller than that of said outer array, said mandrels in said inner and outer arrays being staggered so that mandrels in one of said arrays are substantially equidistant from adjacent mandrels in the other of said arrays;

Means for indexing said turret to bring each of said first mandrels successively into a first loading station, a coating station and a first unloading station while also bringing each of said second mandrels successively into a second loading station, a printing station and a second unloading station, said stations being spaced around said turret at angular positions separated by an integral multiple of said pitch;

Means at said first loading station for loading a cylindrical article on the mandrel in said outer array indexed into said first loading station;

Means at the coating station for applying a coating to the external surface of the article on the mandrel in said outer array indexed into said coating station, said coating means including a coating roller located outside of said arrays and arranged to contact articles on said outer array while avoiding contact with articles on said inner array so that only articles on said outer array are coated;

Means at said first unloading station for removing coated articles from the mandrel in said outer array indexed into said first unloading station for curing of said coating;

Means at said second loading station for loading cured articles on the mandrel in said inner array indexed into said second loading station;

Means at said printing station for applying a coating of print to cured articles on the mandrel in said inner array indexed into said printing station, said printing means including a printing drum located wholly outwardly of said arrays and having a raised printing surface interpenetrating said outer array for contacting cured articles on said inner array, said raised printing surface covering only a portion of the circumference of said printing drum so that rotation of said printing drum carries said raised printing surface away from said arrays while the mandrels on said outer array index through said printing station whereby only articles on said array are printed; and Means at said second unloading station for removing printed articles on the mandrel in said outer array indexed into said station.

Figure 1:
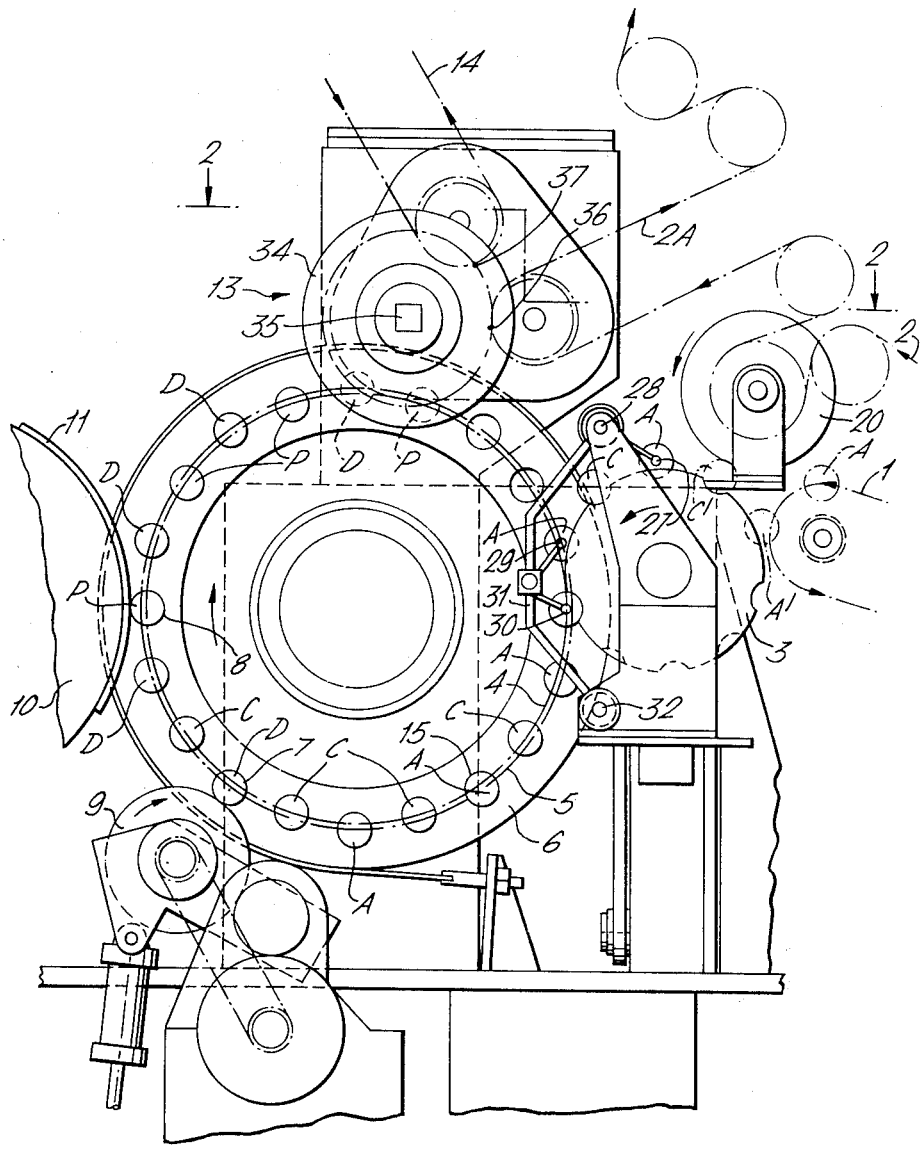
FIG. 1 shows a somewhat diagrammatic side elevation of a machine for performing a two stage coating and printing operation upon the outer surface of cylindrical tubes, such as those used for the dispensing of toothpaste or like substances.

It will be understood that this particular embodiment is included by way of example only and is not intended to limit the scope of the invention in any way.

In the manufacturing of dispensing tubes it is necessary to coat the newly extruded tube with a first layer of paint which acts as a base for the later printing of any desired information or decoration. The coating layer must then be cured in an oven prior to the application of the final printed information and it has been the usual practice to perform the coating and printing operations in separate machines. The preferred embodiment of the present invention enables both of these operations to be completed in the one machine, with the coated tubes being returned to the machine for printing after curing in a separate oven. In addition to the coating and printing stages it is also possible to include a provision whereby closure caps are applied to the tube necks in the same apparatus; the whole arrangement achieving a considerable saving in space and equipment.

In the illustrated embodiment, tubes are fed to the machine in two different stages of completion. The tubes being supplied by conveyor 1 are newly extruded, annealed and uncoated. Throughout the description and drawings these tubes will be denoted by the letter "A". Those tubes being supplied by chain conveyor 2 have already been coated and cured but are awaiting the final printing operation; These tubes are denoted by the letter "C". Tubes from both conveyors 1 and 2 are transferred to a tube loading drum 3 which indexes in the direction shown to bring the coated and uncoated tubes respectively into register with mandrels forming part of an inner and an outer array, located respectively on two pitch circles 4 and 5 concentric with the axis of rotation of turret 6. The operation of the loading mechanism will be described in more detail later. The number of mandrels in each array is equal and those in one array are in staggered relationship with those in the other with each mandrel being angularly equally spaced from its neighbor such that indexation of the turret 6 brings two mandrels 7 and 8 from different arrays respectively into register with a coating roller 9 and printing drum 10.

The coating roller 9 is disposed such that it will always come into coating engagement with tubes A located on the outer mandrel array but will fail to contact those cured tubes C on the inner array. The fresh tubes A which have been coated but not yet cured are denoted by the letter "D".

By using this arrangement it is therefore unnecessary to retract the coating roller 9 in order to avoid double coating the tubes located on the inner mandrel array. These cured tubes C index past the coating roller 9 until they come into register with printing drum 10, at which point a raised printing surface or blanket 11 rotates past the tube located upon mandrel 8 and applies the final coating of print; the printed tubes being now referred to by the letter "P". Upon the following indexation, the freshly coated tube D on mandrel 12 will come into angular register with the printing drum 10 but will avoid an application of print by virtue of the raised printing blanket 11 having moved away from the printing station. In this way, the freshly coated tubes D are spared the printing operation just as the cured tubes C avoid the coating stage.

The tubes are removed from the mandrels by means of the transfer mechanism 13 which places the freshly coated tubes D upon the downstream portion 2A of chain conveyor 2, and the printed tubes P upon a similar conveyor 14. This transfer mechanism is described in more detail below. Both chain conveyors transport the tubes through a curing process after which the printed tubes are suitable for further manufacturing operations such as capping or filling. However, the newly coated tubes are returned from the curing process to the loading drum 3 prior to being reloaded onto the inner mandrel array for their final print application. Desirably, a conventional capping station is provided on the present apparatus to apply caps to the annealed tubes at position 15 prior to their reaching the coating station.

Figure 2:
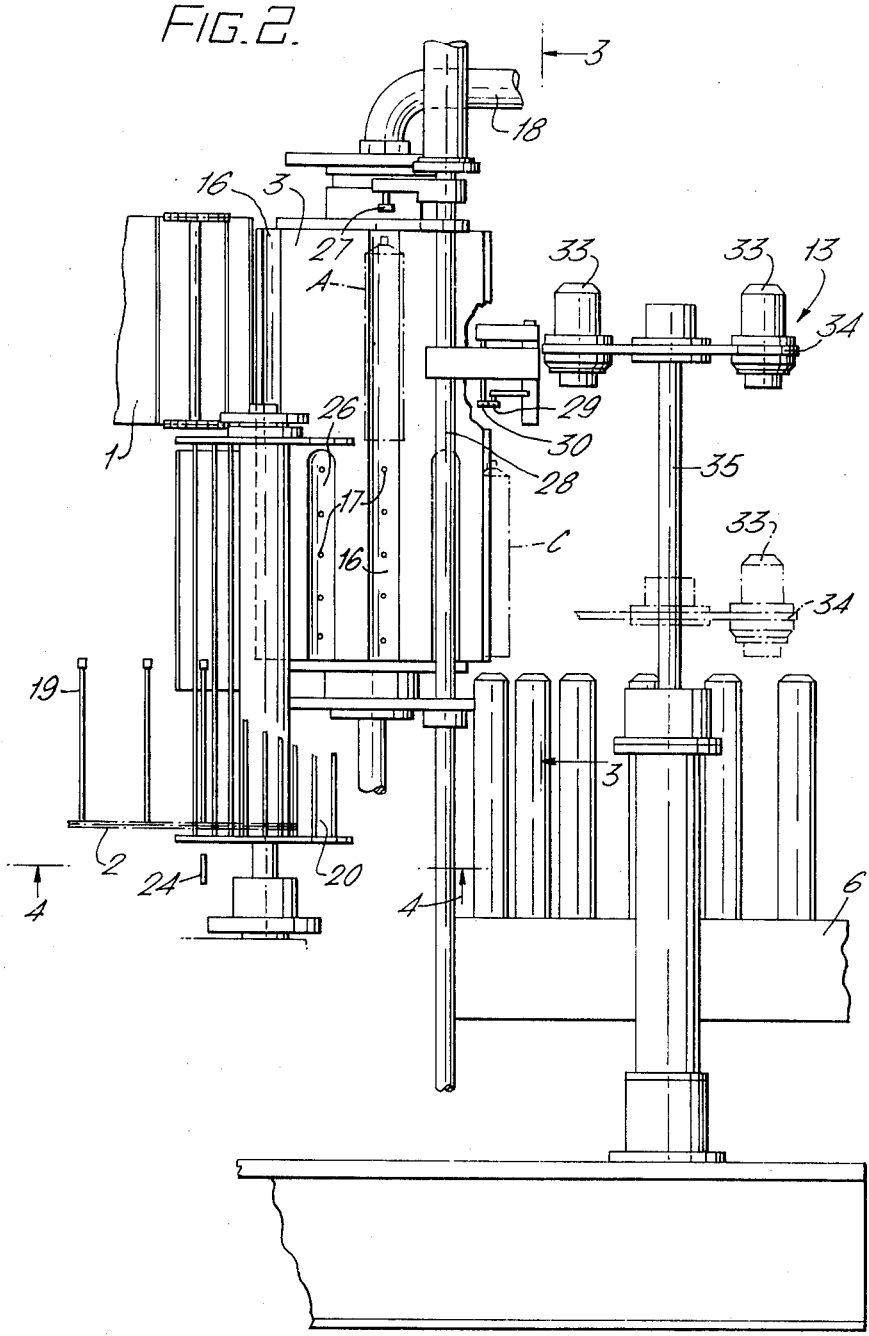
FIG. 2 is a more detailed fragmentary view taken on line 2—2 of FIG. 1 but a larger scale.
Figure 3:
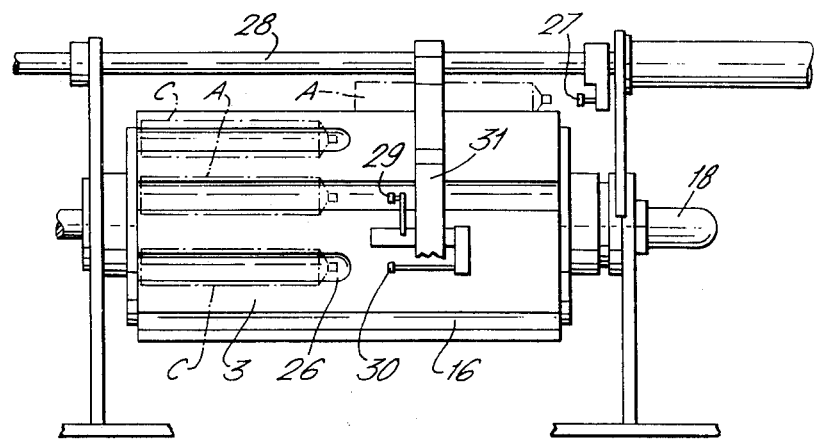
FIG. 3 is a view taken on line 3—3 of FIG. 2.
Figure 4:
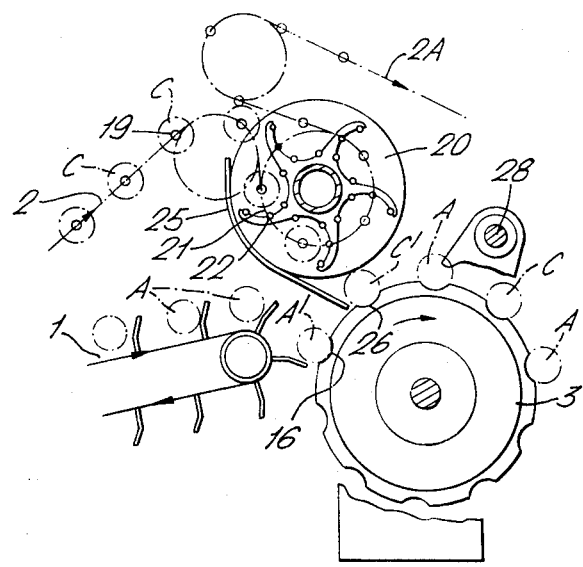
FIG. 4 is a view taken on line 4—4 of FIG. 2.

Turning now to the means by which the tubes are positioned on the mandrels, reference to FIGS. 2 and 4 shows the conveyor 1 depositing a newly extruded, annealed tube A' onto a long groove 16 formed in the surface of the loading drum 3. The tube is held to the drum by means of an air pressure difference set up by holes 17 formed along the base of the grooves which communicate with a region of low pressure induced within the drum 3 by vacuum pipe 18.

At the same time, coated and cured tubes C are returned from an oven (not shown) located upon pins 19 on chain conveyor 2. The conveyor 2 traverses a rotating cage 20 having a plurality of cradles 21 defined by longitudinally extending rods 22 when a tube C comes into register with a cradle 21, an air jet 24 blows the tube off its pin and onto the cradle. As the cage 20 rotates, the tube C' is guided along a shute 25 and released by the cradle at the appropriate time to fall into engagement with a short groove 26 in the loading drum 3.

The drum then indexes by two groove spacings in the direction shown and tube A' comes into register with a pusher arm 27 which is attached to a slidably mounted shaft 28. The shaft 28 then slides inwardly and the pusher arm 27 moves tube A' along groove 16 until it is longitudinal alignment with tube C'. Upon a further indexing of the drum, tubes A' and C' come respectively into alignment with pusher arms 29 and 30 which extend from a support bar 31 which is fixedly attached to shaft 28 and an idler shaft 32. At this position, the tubes are in register with the appropriate mandrels upon turret 6 and when the shaft 28 next moves inwardly, both tubes are simultaneously transferred from the drum to the mandrels.

The transfer mechanism 13 for removing the tubes form the mandrels comprises a number of gripping devices 33 located in angularly spaced relationship around a circular plate 34 which is fixed to a slidably mounted square shaft 35. The gripping devices 33 are pneumatically operated and engage the cape or threaded knock pieces of two adjacent tubes when shaft 35 slides inwardly, causing the mechanism to adopt the position shown in phantom lines on FIG. 2. When the two tubes D and P are withdrawn from the mandrels the shaft 35 rotates and brings them respectively into register with two pins 36 and 37 on conveyor chains 2 and 14 respectively. The mechanism then moves inwardly again, placing the tubes upon the conveyors and gripping a further two tubes from the mandrels to begin the operation again.

Although the present invention has been described with reference to a specific piece of apparatus used in the manufacture of one particular product, it will be readily appreciated that this description has been included for exemplary purposes and is not intended to limit the generality of the invention.

The claims defining the invention are as follows:

1. Apparatus for performing coating and printing operations on each of a series of cylindrical articles comprising:

a rotatable turret;

a plurality of first axially directed mandrels fixed to said turret and equally circumferentially pitched in an outer circular array coaxial with said turret;

a similar plurality of second axially directed mandrels fixed to said turret, said second mandrels being equally circumferentially pitched in an inner circular array concentric with said outer array and having a diameter smaller than that of said outer array, said mandrels in said inner and outer arrays being staggered so that mandrels in one of said arrays are substantially equidistant from adjacent mandrels in the other of said arrays;

means for indexing said turret to bring each of said first mandrels successively into a first loading station, a coating station and a first unloading station while also bringing each of said second mandrels successively into a second loading station, a printing station and a second unloading station, said stations being spaced around said turret at angular positions separated by an integral multiple of said pitch;

means at said first loading station for loading a cylindrical article on the mandrel in said outer array indexed into said first loading station;

means at the coating station for applying a coating to the external surface of the article on the mandrel in said outer array indexed into said coating station, said coating means including a coating roller located outside of said arrays and arranged to contact articles on said outer array while avoiding contact with articles on said inner array so that only articles on said outer array are coated;

means at said first unloading station for removing coated articles from the mandrel in said outer array indexed into said first unloading station for curing of said coating;

means at said second loading station for loading cured articles on the mandrel in said inner array indexed into said second loading station;

means at said printing station for applying a coating of print to cured articles on the mandrel in said inner array indexed into said printing station, said printing means including a printing drum located wholly outwardly of said arrays and having a raised printing surface interpenetrating said outer array for contacting cured articles on said inner array, said raised printing surface covering only a portion of the circumference of said printing drum so that rotation of said printing drum carries said raised printing surface away from said arrays while the mandrels on said outer array index through said printing station whereby only articles on said inner array are printed; and means at said second unloading station for removing printed articles on the mandrel in said outer array indexed into said station.

2. Apparatus as claimed in claim 1 wherein the respective means for loading said articles on the mandrels in said inner and outer arrays includes means for simultaneously positioning a pair of articles on an adjacent pair of mandrels, one of the mandrels in said adjacent pair being in said outer array and in said first loading station, the other of the mandrels in said adjacent pair being in said inner array and in said second loading station.

3. Apparatus as claimed in claim 2 wherein the respective means for loading said articles on the mandrels in said inner and outer arrays includes a substantially cylindrical drum having circumferentially spaced longitudinal grooves formed in the surface thereof, means for indexing said drum with said turret to bring an adjacent pair of grooves into register with said adjacent pair of mandrels in the respective loading stations, means for progressively supplying articles intended for said first mandrels and said second mandrels respectively to alternate said grooves, retaining means for holding said articles in said grooves, and pushing means for sliding adjacent articles onto said adjacent pair of mandrels.

4. Apparatus as claimed in claim 1 wherein the respective means for removing said articles from said mandrels in said inner and outer arrays includes gripping means for simultaneously withdrawing a pair of articles from an adjacent pair of mandrels, one of the mandrels in said adjacent pair being in said outer array and in said first unloading station, the other of the mandrels in said adjacent pair being in said inner array and in said second unloading station.

5. Apparatus as claimed in claim 4 wherein said gripping means includes a plurality of gripping elements circumferentially spaced upon a rotatable and axially reciprocable turret-head, means for indexing said turret-head with said turret to bring an adjacent pair of gripping elements into register with said adjacent pair of mandrels in the respective unloading stations, means for moving said turret-head axially to engage and withdraw said pair of articles, a pair of conveyor means justaposed to said turret-head and having respective retaining elements for receiving said pairs of withdrawn articles, said conveyor means located so that subsequent indexing of said turret-head to grip and withdraw a further pair of articles brings the pair of articles previously withdrawn into register with said retaining elements, and means for releasing said gripping elements to release said previously withdrawn pair of articles to said retaining elements.

* * * * *